United States Patent
Kann

(10) Patent No.: US 11,898,883 B1
(45) Date of Patent: Feb. 13, 2024

(54) UTILITY RESTRICTION COMPLIANCE MONITORING AND MITIGATION

(71) Applicant: Itron, Inc., Liberty Lake, WA (US)

(72) Inventor: James Lee Kann, Mica, WA (US)

(73) Assignee: ITRON, INC., Liberty Lake, WA (US)

( * ) Notice: Subject to any disclaimer, the term of this patent is extended or adjusted under 35 U.S.C. 154(b) by 0 days.

(21) Appl. No.: 17/901,961

(22) Filed: Sep. 2, 2022

(51) Int. Cl.
*G01D 4/00* (2006.01)
*G08C 17/02* (2006.01)
*G06Q 50/06* (2012.01)

(52) U.S. Cl.
CPC ............ *G01D 4/004* (2013.01); *G06Q 50/06* (2013.01); *G08C 17/02* (2013.01)

(58) Field of Classification Search
CPC .......... G01D 4/00; G01D 4/002; G01D 4/004; G01D 4/008; H04Q 2209/00; H04Q 2209/10; H04Q 2209/40; H04Q 2209/60; H04Q 2209/70; H04Q 2209/80; G06Q 50/06; G08C 17/02
See application file for complete search history.

(56) References Cited

U.S. PATENT DOCUMENTS

| | | | |
|---|---|---|---|
| 7,930,069 B2 * | 4/2011 | Savelle, Jr. | A01G 25/167 700/19 |
| 11,601,506 B2 * | 3/2023 | Cornwall | G01D 4/008 |
| 2011/0112780 A1 * | 5/2011 | Moss | H02J 13/00026 702/62 |
| 2017/0105369 A1 * | 4/2017 | Shamley | G01D 4/004 |
| 2022/0196448 A1 * | 6/2022 | Cornwall | G01F 15/063 |

* cited by examiner

*Primary Examiner* — Franklin D Balseca
(74) *Attorney, Agent, or Firm* — Lee & Hayes P.C.

(57) ABSTRACT

Techniques for obtaining and processing utility consumption data (e.g., gas, water, electricity, etc.) of a utility network to determine if a violation has occurred with respect to a restriction schedule associated with a service site. By way of example, a number of utility restriction schedules associated with a number of service sites may be generated that indicate, for example, a type of restricted activity and/or event (e.g., irrigation), seasons and/or which days activity is allowed or not allowed, duration activity is allowed, and/or mitigation to take place if a violation is detected. A device (e.g., a smart utility meter, a router, etc.) may monitor utility consumption and detect a particular usage activity (e.g., irrigation) via data disaggregation. The device may compare the activity to the restriction schedule for that particular service site and perform automatic mitigation if a violation is detected.

20 Claims, 7 Drawing Sheets

UTILITY RESTRICTION COMPLIANCE MONITORING AND MITIGATION

BACKGROUND

Smart metering devices (e.g., sometimes referred to as "smart utility meters," in the electrical, gas, water and other utility industries) provide substantial information, which may be used to improve the performance and/or economy of many systems, networks, smart meters, appliances and/or other devices. Utilities providers and cities implement restrictions (e.g., water restrictions) during times of low utility availability (e.g., during a drought or heatwave). Restrictions usually take the form of limits on utility usage, such as irrigation days and times, electricity consumption during times of peak demand (e.g., during heat waves due to higher than normal air-conditioning load), and/or gas consumption during times of peak demand (e.g., during a cold snap as gas pressures drop due to above average demand). Detection of non-compliance is generally achieved via manual visual inspection by field personnel or via neighbor reporting. Those detection mechanisms are costly, inefficient, unreliable, and not comprehensive.

Utility providers and cities desire restriction compliance monitoring, non-compliance notification, and mitigation to be automatic, comprehensive, and cheap.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

DETAILED DESCRIPTION

Overview

Figure 1:
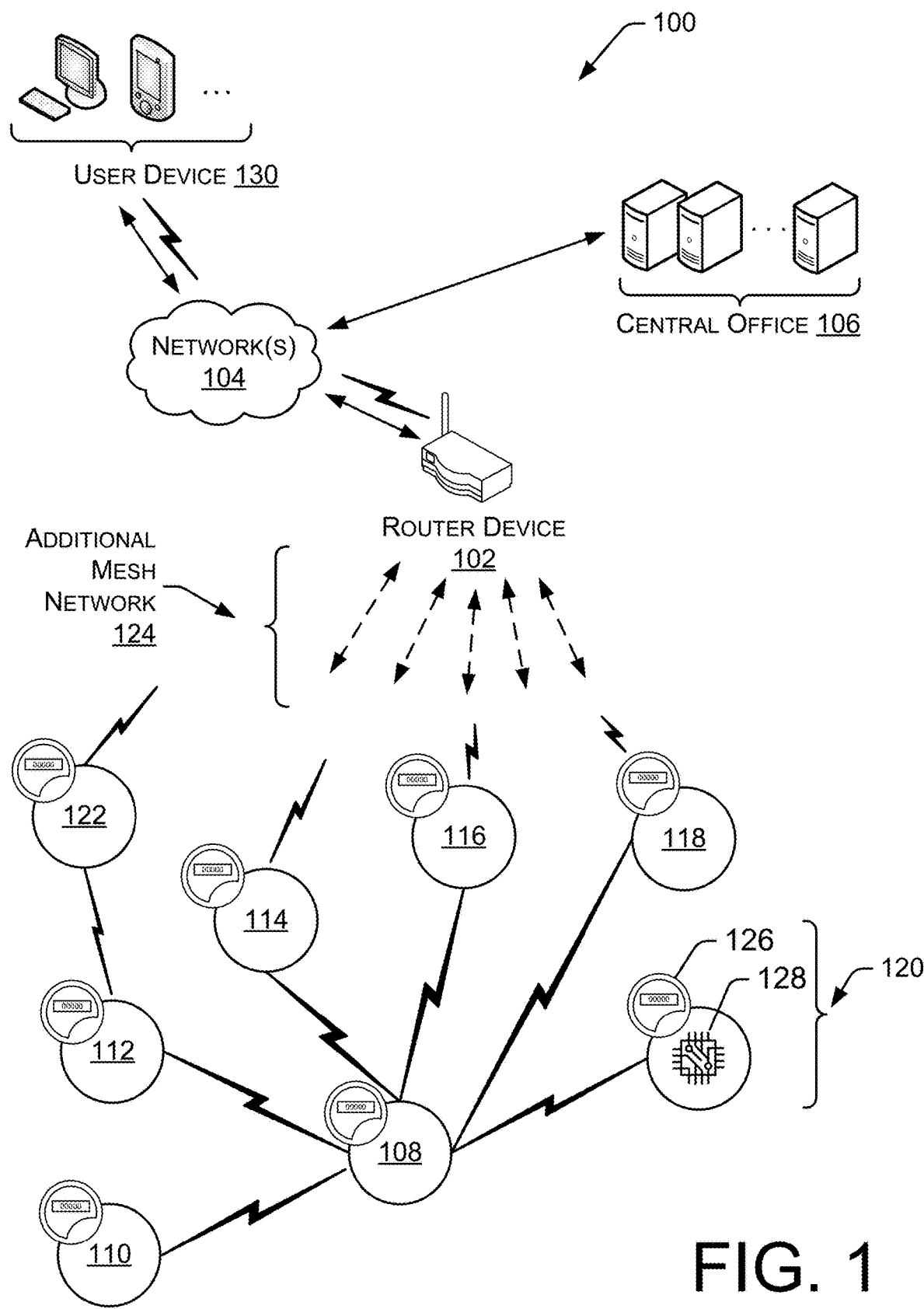
FIG. 1 is a diagram showing portions of an example utility service and network of metering devices configured for metrology, data transfer, data processing, and/or other functionality.

The disclosure describes techniques for obtaining and processing information from a utility (e.g., gas, water, electricity, etc.) of a utility network to determine if a violation has occurred with respect to a service site restriction schedule. By way of example, a number of utility restriction schedules associated with a number of service sites may be generated that indicate, for example, a type of restricted activity and/or event (e.g., irrigation), seasons, days, and/or times on which an activity is allowed or not allowed, duration activity is allowed, and/or mitigation to take place if a violation is detected. A device (e.g., a smart utility meter, a router, etc.) may monitor utility consumption to detect a particular usage activity (e.g., irrigation) via data disaggregation (as described below). The device may compare the activity to the restriction schedule for that particular service site and perform automatic mitigation if a violation is detected. In some cases, a mitigation action may include notifying a utility provider of the activity, issuing a warning and/or citation to a user associated with the service site, and/or partially or fully restricting access to the utility for a time period (e.g., 1 hour). In some cases, after lifting the restriction, the device may increase a rate of sampling flow and/or consumption to more quickly redetect a resumed or continued violation of the restriction schedule. In some cases, mitigation in the schedule can change based on past violation history. For example, a first violation in a given month may result in a warning, a second violation in the given month may result in a citation, and a third violation in the given month may result in a restriction to access to the utility, a fourth or subsequent violation may result in a longer and/or more restricted access to the utility. In some examples, users associated with the service site (e.g., the homeowner) can be notified of warnings, citations, and restrictions via a metering device (e.g., water meter, electricity meter, gas meter, etc.), an in-home device (e.g., home hub, thermostat, etc.), a computer, mobile device (e.g., smartphone(s) or tablet(s)), or other device or service. In some examples, users associated with the service site (e.g., the homeowner) can receive or access the notifications via a website, application, text message, etc., via one or more of the devices described above.

In some examples, a device, such as a smart utility meter, a router operating in a utility network, and/or a server of a utility supplier, may obtain utility consumption data associated with a utility available for consumption at the service site. For example, in cases where the device is a smart utility meter, the device may monitor a flow of the utility (e.g., water, gas, electricity, etc.) between the utility provider and a consuming device (e.g., an appliance, an irrigation system, an air conditioning unit, etc.) located at the service site and store measured utility consumption data on a memory of the device. In some cases, the device may also obtain timing data indicating a duration of consumption. By way of example and not limitation, the duration of consumption may be based at least in part on a number of time intervals between switch closures of the smart utility meter, wherein each switch closure indicates measurement of a unit of the utility. In cases, where the device is a router and/or a server of the utility supplier, the device may receive the utility consumption data from the smart utility meter located at the service site.

Once the utility consumption data is obtained, the device may determine, based at least in part on a utility restriction schedule associated with the service site, that the utility consumption data indicates a violation of the utility restriction schedule. For example, the device may store, and/or otherwise obtain the utility restriction schedule associated with the service site in which the smart utility meter is measuring utility consumption. The utility restriction schedule may indicate that particular activities (e.g., irrigation, air-conditioning, operating a dishwasher, etc.) are not permitted at the service site during particular time periods (e.g., every Monday during the Winter, every Monday/Wednesday/Friday during the Spring, any day during the Summer, etc.). The device may determine that one of these restricted activities occurred and/or is in occurrence at the service site during the restricted time (e.g., via data disaggregation, as described below) based on the obtained utility consumption data.

In some examples, the device may determine a number of previous violations associated with the service site and determine, based at least in part on the number of previous violations exceeding a threshold value, to restrict access to the utility at the service site. For example, the device may store and/or otherwise have access to historical data associated with the service site that includes an indication of how many previous violations have occurred at the service site, a frequency of occurrence of the previous violations, a magnitude of the previous violations, etc. The magnitude of previous violations may include an amount of utility resource used during the violations. In some cases, the historical data may be associated with a user account (e.g., as opposed to a service site) such that the previous violations are associated with a user associated with the user account to ensure that escalating mitigating actions are applied to the offending user, and to avoid penalizing a new owner where the service site has changed owners. The mitigation actions may change based on a number of previous violations associated with the service site and/or the user account. For example, a first violation in a given month may result in a warning, a second violation in the given month may result in a citation, and a third violation in the given month may result in a restriction to access to the utility. Fourth and/or subsequent violations may result in progressively increasing restrictions (e.g., longer and/or more restrictive restrictions), consequences (increasing fines or citations), and/or other mitigating actions. In one example, where the utility includes water and the restricted activity includes an irrigation activity, the device may restrict access to the water at the service site by reducing a flow rate of the water such that the water is unable to be utilized for outdoor irrigation, but still have enough flow rate for the service site to use a sink and/or a shower.

In some examples, the device may generate a notification to a user associated with the service site indicating that access to the utility has been restricted and transmit the notification to a user device associated with the user. For example, the device may access an application programming interface (API) accessible via a user device and send messages to the user device via the API. In some cases, the device may cause a text-message, voicemail, email, or any other kind of communication to be sent to the user device indicating that the utility has been restricted due to a restriction violation. In some examples, the user device may include an in-home device, such as a thermostat, a voice-controlled device, a television, etc.

In an example, data acquisition steps are performed by device(s) that are specialized to measure fluid flowrates. In particular examples, the time between read switch closures and/or the generation and/or timing of an ultrasonic pulse transit are performed by specialized devices (e.g., timers, processors, etc.). Accordingly, these functions are "concrete" actions, involving mechanical actions (e.g., switch closures and pulses), and not abstract concepts. Similarly, disaggregation and historic comparisons are too complex to be performed by a human, and cannot practically be performed in a timely manner in order to implement the techniques described herein in substantially real time.

When the techniques discussed herein are performed locally (e.g., by meters, routers, transformers, hubs, or other devices located at or immediately proximate the service site), such actions decrease the amount of traffic over the network (thereby increasing network performance). Such a network and/or systems are therefore more efficient, conserve battery power (less traffic means less repeated messages, etc.).

Accordingly, the techniques described herein allow utility systems to perform restriction compliance monitoring, non-compliance notification, and automatic mitigation in a comprehensive and inexpensive manner without the need for additional sensors throughout the distribution network.

Example Networks, Systems and Techniques

FIG. 1 shows portions of an example system 100, comprised of portions of a utility-supply system and portions of a communications network. In example systems, the topology of the communication networks may or may not match or directly correspond to the topology of the distribution networks. The utility supply system may include utility supply equipment, utility pipes or cables/wires for utility transport, metering at each customer site, valves and other control devices and control circuitry, as required. The communication network may include a plurality of nodes, some of which are in communication with one another. A node may be part of a communications system associated with a utility supply system, and may include a one-way or two-way radio, a processor, memory and/or other components. At least some nodes may be associated with a device of a utility supply system, such as a utility meter (e.g., smart utility meter). In some examples, the communication network may be comprised of one or more individual networks (e.g., mesh networks, star networks, etc.). FIG. 1 illustrates an example in which the nodes are organized in one or more mesh networks.

In some examples, a root node (e.g., the router device 102) may be in radio frequency (RF) communication with one or a plurality of nodes in the mesh network. The router device 102 may communicate, via one or more networks 104 (e.g., wired or wireless, such as a cellular or RF connection), with a central office 106 (e.g., of a utility provider) having a server (e.g., remote from the nodes 108-122), which may include one or more computing devices, such as servers associated with a utility company, or servers having a role in managing, owning, providing, or using the communication network and the nodes and devices of, and/or associated with, that network. In some examples, a server in the central office 106 may manage many networks, and may use one or more router devices to communicate with devices in each network. Examples of such networks may include older and newer nodes, which may use different technologies.

In the example of the communications network, a node (e.g., node 108) has a plurality of one-hop neighbors (e.g., nodes 110-120), each of which may be connected to a same or a different utility supply pipe or cable/wire. In the example, the network of the example system 100 may be a mesh network, including a plurality of devices that relay information upstream and downstream, such as between a router device and a plurality of nodes using parent nodes to relay data for child nodes.

The node 108 is part of the mesh network of the example system 100. In the example shown, the node 108 is the parent node to a child node 110 that is downstream from the node 108. That is, child node 110 depends on its parent, node 108, to relay messages upstream (e.g., to the router device 102) and downstream (e.g., from the router device 102).

In the example shown, a plurality of one-hop upstream neighbors to node 108 are shown, including nodes 112-120 which are reached by "one hop" through the RF mesh network. Node 110 (a child of node 108) is a one-hop neighbor but is downstream of node 108. While nodes 112-120 are shown as one-hop upstream neighbors of node 108, the number of one-hop upstream neighbors for any node may be fewer or much larger, depending on network layout, geometry, RF conditions, etc. Accordingly, the example of FIG. 1 is for purposes of illustration and explanation and is not intended to convey any limitations to the systems and/or techniques described.

A region of additional mesh network 124 of the mesh network of the example system 100 is representative of a potentially large number of nodes. The nodes may be configured to relay data upstream and downstream for the nodes 108-122 that are located downstream of the additional mesh network 124. While not all nodes are shown individually, the mesh network may have many hundreds or many thousands of nodes, and the drawings shown are accordingly simplified to better convey the illustrated concepts.

Figure 2:
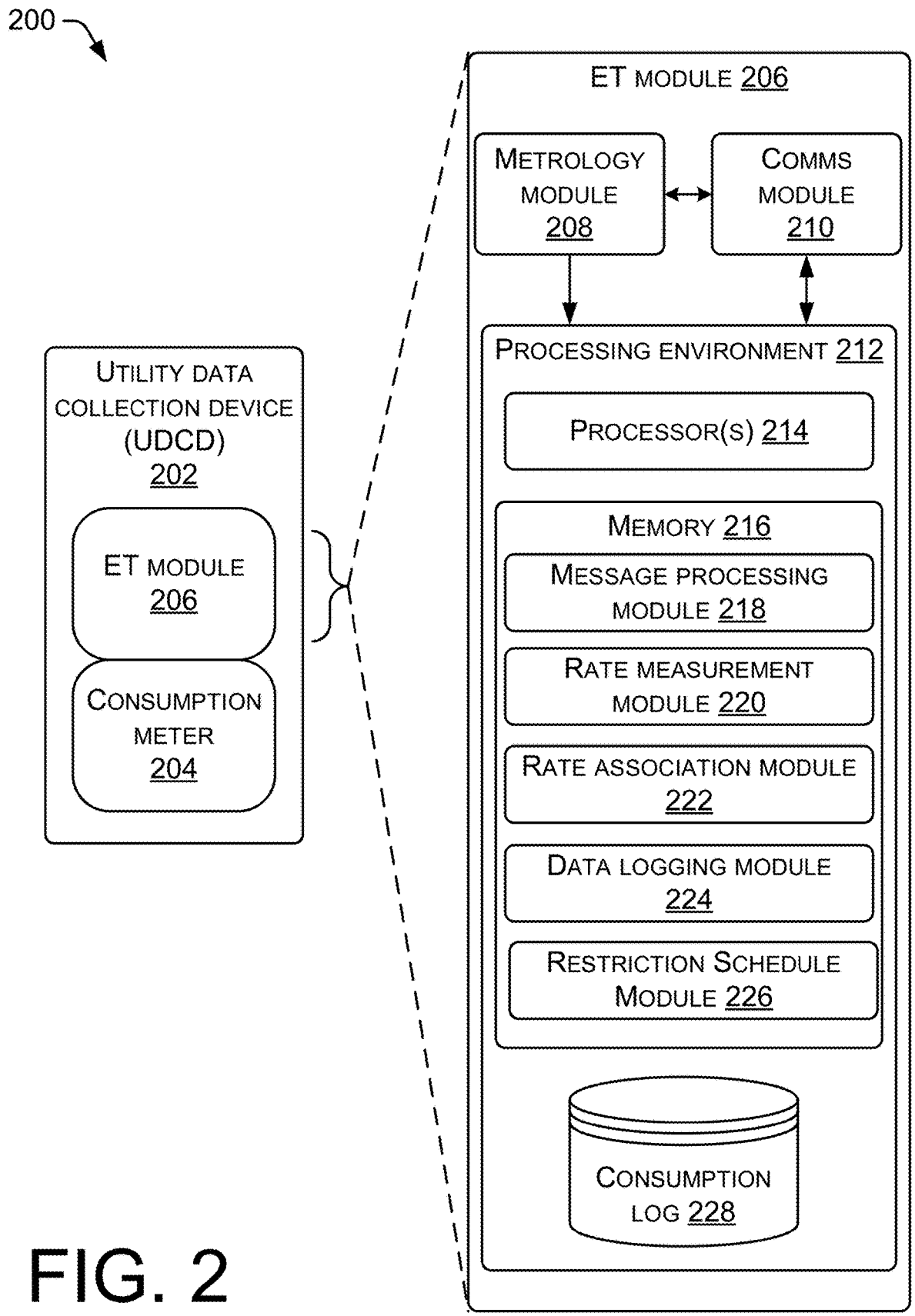
FIG. 2 is a schematic diagram of an example utility data collection device for associating utility flowrates with utility consuming loads to identify violations.

In some examples of the network of the example system 100, each node may contain various components. In the example of node 120, a metrology device 126 and a data processing component 128 are representative of such components. The metrology device 126 may be solid-state, and may calculate utility flowrate in part from the input of an ultrasonic sensor, transducer or other device. The metrology device 126 may be mechanical, and upon measurement of a unit of utility may close a switch or send a signal. An additional example of such components is shown in FIG. 2. The data processing components of some or all of the nodes in the network may be configured to include modules for enablement of various purposes and techniques discussed herein.

Example Monitoring of a Utility and Mitigation Action

In some examples, a device, such as the node 120, may obtain utility consumption data associated with a utility available for consumption at a service site in which the node 120 is located (a service site may include a geographical area in which the node 120 is located). For example, the node 120 may include a smart utility meter and may monitor a flow of the utility (e.g., water, gas, electricity, etc.) between the utility provider (e.g., of the central office 106) and a consuming device (e.g., an appliance, an irrigation system, an air conditioning unit, etc.) located at the service site and store measured utility consumption data on a memory of the node 120. In some cases, the node 120 may also obtain timing data indicating a duration of a number of time intervals between switch closures of the node 120, wherein each switch closure indicates measurement of a unit of the utility.

Once the utility consumption data is obtained, the node 120 may determine, based at least in part on a utility restriction schedule associated with the service site, that the utility consumption data indicates a violation of the utility restriction schedule. For example, the node 120 may store, and/or otherwise obtain the utility restriction schedule associated with the service site in which the node 120 is measuring utility consumption. The utility restriction schedule may indicate that particular activities (e.g., irrigation, air-conditioning, operating a dishwasher, etc.) are not permitted at the service site during particular time periods (e.g., every Monday during the Winter, every Monday/Wednesday/Friday during the Spring, any day during the Summer, etc.). The node 120 may determine that one of these restricted activities occurred and/or is in occurrence at the service site during the restricted time (e.g., via data disaggregation, as described below) based on the obtained utility consumption data.

In some examples, the node 120 may determine a number of previous violations associated with the service site and determine, based at least in part on the number of previous violations exceeding a threshold value, to restrict access to the utility at the service site. For example, the node 120 may store and/or otherwise have access to historical data associated with the service site that includes an indication of how many previous violations have occurred at the service site. In some cases, the historical data may be associated with a user account (e.g., as opposed to a service site) such that the previous violations are associated with a user associated with the user account to prevent repeat violator mitigation actions in cases where the service site has changed owners. The mitigation actions may change based on a number of previous violations associated with the service site and/or the user account. For example, a first violation in a given month may result in a warning, a second violation in the given month may result in a citation, and a third violation in the given month may result in a restriction to access to the utility, a fourth or subsequent violation may result in a longer and/or more restricted access to the utility. In one example, where the utility includes water and the restricted activity includes an irrigation activity (e.g., an outdoor irrigation activity such as using a sprinkler system), the node 120 may restrict access to the water at the service site by reducing a flow rate of the water such that the water is unable to be utilized in outdoor irrigation, but still have enough flow rate for the service site to use other appliances, such as a sink and/or a shower.

In another example in which the utility includes electricity, the restriction schedule may include rules for restricting electricity usage, such as but not limited to, certain types of electrical appliances during certain days of the week, times of the day, etc. For example, the restriction schedule may indicate for a given service site that air conditioners can only be used from 8:00 a.m. to 5:00 p.m. The node 120 may detect that an electricity flow at 5:05 p.m. corresponds to a known wattage corresponding to an air conditioner and, in response, perform a mitigation action. In some cases, the mitigation action may include reducing a flow of electricity to the service site such that the air conditioner may not be operated.

In some examples, the node 120 may generate a notification to a user associated with the service site indicating that access to the utility has been restricted and transmit the notification to a user device 130 associated with the user. For example, the node 120 may access an application programming interface (API) accessible via the user device 130 and send messages to the user device 130 via the API. In some cases, the node 120 may cause a text-message, voicemail, email, or any other kind of communication to be sent to the user device 130 indicating that the utility has been restricted due to a restriction violation. In some examples, the user device 130 may include an in-home device, such as a thermostat, a voice-controlled device, a television, etc.

In some examples, a mitigation action resulting in a utility restrictions and/or reduction may be taken prior to detecting any violations by a user associated with the service site. That is, the restriction schedule stored and/or otherwise referenced by the node 120 may include a scheduled utility restriction event that causes a reduction in access to a utility. In some cases, these scheduled utility restrictions events may be unrelated to a detected violation of a particular user and/or service site associated with a user. Rather, a utility supplier may determine that there is likely going to be an upcoming utility shortage over a particular period of time (e.g., a shortage of water during a drought, a shortage of electricity during a heat wave, a shortage of natural gas during a cold snap, etc.) and cause the node 120 to restrict flow of the utility during that period of time. In some cases, a flag and/or another type of indication may be inserted into the restriction schedule stored by the node 120 that indicates the utility to be restricted, a flow rate in which the utility is to flow at during the restriction, and/or a period of time in which the utility restriction is to take place (e.g., a start and stop time, a length of time of the restriction etc.). In some examples, the scheduled utility restriction event may be implemented by the node 120 in response to determining that a user and/or service site associated with the user is a repeat violator of the utility restriction schedule. For example, the node 120 may and/or the utility supplier may determine that the user is associated with a non-compliant site and that fines have been levied but not yet paid. In responses, the user may be subject to the scheduled utility restriction event until the fines are paid.

Example Disaggregation of Utility Consumption Data

In some examples, in order to determine if a violation has occurred, it must first be determined what the determined usage of the utility actually was. That is, what activity was being performed using the utility at the service site. Existing utility meters may totalize utility usage over a period of time, such as per hour or per month, and record this usage as an hourly or monthly total consumption amount. However, such meters fail to provide instantaneous consumption information and fail to associate consumption with individual consuming appliances and/or activities.

The techniques described herein for utility flowrate determination may be implemented by an enhanced or smart utility meter (e.g., an endpoint), central/headend office or other location. The techniques may accumulate utility usage information and determine various consumption rates associated with utility consuming loads and/or utility consuming activities (e.g., fixed-rate consumption utility appliances). As an example, an enhanced utility meter measures utility flowrates, categorizes the measured utility flowrates, associates the categorized utility flowrates with utility consuming loads and/or appliances and outputs a result to include utility consumption data with the utility consuming loads. In this example, utility flowrates of individual utility consuming loads and utility flowrates indicating simultaneous operation of multiple individual utility consuming loads may be recognized. Utility consuming loads and/or appliances (e.g., sprinkler system, shower, dishwasher, washing machine, etc.) may be associated with utility consumption so that a consumer may track a total consumption or a total cost of operating individual appliances over a measurement period.

Various utility consuming loads, such as a sprinkler system, shower, dishwasher, washing machine, etc., may use a variable rate of utility (e.g., water) depending on a number of sprinklers in operation and/or a flowrate to the respective faucet (in the case of a sink). By recording an amount of utility used at various consumption rates, information may be extracted that indicates how much utility is used by individual utility consumption loads.

A usage profile may be collected, such as by a utility company, and used to determine a specific activity being performed at the service site and/or which load is being used at the service site based on comparing the measured utility consumption data to the usage profile. By way of example, a usage profile for a particular service site may indicate a number of usage events and their associated average flowrates and/or average volumes. For example, a toilet flush may correlate to an average flow rate of 1-10 liters per minute (L/min) and an average volume of 9-16 L. A shower usage may correlate to an average flow rate of 6-19 L/min. A dishwasher usage may correlate to an average flow rate of 5-7 L/min and an average volume of 15-40 L. A washing machine usage may correlate to an average volume of 45-170 L. A faucet usage may correlate to an average flow rate of 7 L/min. An irrigation usage may correlate to an average flow rate of 30-70 L/min. A bath usage may correlate to an average flow rate of 19-20 L/min and an average volume of 70-170 L. As the utility consumption data is obtained in real-time, the flowrate identified in the utility consumption data may be determined and compared to flowrates of known utility loads to identify the activity being performed and/or the utility load being used.

Example Environment for Determining a Violation and Mitigation Action

FIG. 2 is a schematic diagram of example architecture 200 of a utility data collection device for associating utility consumption and/or utility flowrates with utility consuming loads and/or utility appliances in order to determine if a violation of a utility restriction schedule has occurred and, if so, perform one or more mitigation actions. As shown in example architecture 200, utility data collection device (UDCD) 202 (e.g., a smart utility meter) includes a consumption meter 204. As an example, consumption meter 204 may provide a signal or other data indicating measurement of a specific quantity of utility. The signal may also indicate a specific meter type or other information. Consumption meter 204 may be a mechanical rotary meter to include a residential or commercial diaphragm meter, an electromechanical meter, or any other type of meter that measures flow quantity (e.g., consumption quantity) over time, and provides corresponding consumption data.

Encoder-transceiver (ET) module 206 may be configured to process consumption data measured by consumption meter 204 and to measure and/or determine flowrates (e.g., utility flowrates). As an example, ET module 206 may be an encoder-receiver-transmitter (ERT®). ET module 206 may connect to, or integrate with, consumption meter 204 via a direct mount, a remote mount, an integrated construction, etc. ET module 206 and consumption meter 204 are shown in FIG. 2 as separate parts of utility data collection device 202 for simplicity of discussion, but could alternatively be combined or remotely connected.

As shown in FIG. 2, ET module 206 contains metrology module 208 for receiving and processing consumption data from consumption meter 204. Metrology module 208 may be configured to convert the consumption data provided by consumption meter 204 to specific units (e.g., liters, cubic feet, wattage, etc.) and format the consumption data for processing, transmission and/or storage. Metrology module 208 may include memory, one or more processors and one or more modules for processing the consumption data from consumption meter 204.

ET module 206 may also include communications (i.e., comms) module 210. Comms module 210 allows UDCD 202 to communicate with external sources, such as a utility company central office, a mobile wireless meter reading device, a consumer, a user, or the like. Comms module 210 may be configured to format data, such as into frames or data packets associated with one or more communications protocols, and facilitate one-way or two-way communications with external entities. As an example, comms module 210 may include a radio frequency (RF) transceiver and antenna (not shown) to facilitate wireless communications, a power line communications (PLC) transceiver (not shown) for communication via a power line, a direct communication interface, etc. Metrology module 208 and comms module 210 may be communicatively coupled to each other and/or communicatively coupled to processing environment 212.

In the example of FIG. 2, the processing environment 212 is integrated into ET module 206. Processing environment 212 may include one or more processors 214 and memory 216. Memory 216 may comprise computer-readable storage media that includes, but is not limited to, RAM, ROM, EEPROM, flash memory, cache memory, or other hardware storage devices or hardware-based memory technology. Processing environment 212 may include, or be part of, an application-specific integrated circuit (ASIC) or other suitable hardware logic. Memory 216 may store a variety of modules, such as message processing module 218, rate measurement module 220, rate association module 222, data logging module 224, and restriction schedule module 226. Separate from, or integrated with memory 216, is consumption log 228 for storing data associated with processing environment 212.

Message processing module 218 processes messages between UDCD 202 and a utility company, consumer, user, or the like. Message processing module 218 may process various configuration commands to configure, for example, ET module 206. Message processing module 218 may be configured to respond to messages or commands to convey information to users. As an example, message processing module 218 may process external messages or commands received by comms module 210, and format data or response messages for transmission using comms module 210.

Rate measurement module 220 may be configured to process consumption information, such as data received from metrology module 208, to determine various consumption rates (e.g., instantaneous utility flowrates). As an example, rate measurement module 220 is configured to associate a time interval between known amounts of consumption at consumption meter 204, such that consumption rates may be measured over time intervals. Rate measurement module 220 may be configured to process consumption amounts provided by consumption meter 204 via metrology module 208 to determine utility flowrates at consumption meter 204. Rate measurement module 220 may be configured to pass measured consumption rates to rate association module 222.

Rate association module 222 may be configured to categorize measured consumption rates (e.g., utility flowrates) determined or measured by rate measurement module 220. As an example, rate association module 222 may categorize measured flowrates into known activities and/or usage loads. For instance, the rate association module 222 may be provided (e.g., via a utility supplier) or may determine (e.g., based on historical flowrates) average flowrates for water for individual utility loads at a given service sites. By way of example, average rates for some loads may include a toilet flush may correlate to an average flow rate of 1-10 liters per minute (L/min) and an average volume of 9-16 L. A shower usage may correlate to an average flow rate of 6-19 L/min. A dishwasher usage may correlate to an average flow rate of 5-7 L/min and an average volume of 15-40 L. A washing machine usage may correlate to an average volume of 45-170 L. A faucet usage may correlate to an average flow rate of 7 L/min. An irrigation usage may correlate to an average flow rate of 30-70 L/min. A bath usage may correlate to an average flow rate of 19-20 L/min and an average volume of 70-170 L. As the utility consumption data is obtained in real-time via the rate measurement module 220, the rate association module 222 may compare the flowrate of the received utility consumption data to flowrates of known utility loads to identify the activity being performed and/or the utility load being used.

Data logging module 224 is configured to store consumption data in consumption log 228. As an example, as consumption at measured utility flowrates are accumulated, data logging module 224 stores the accumulated consumption data in consumption log 228. Data logging module 224 may be configured to format the consumption data, such that the accumulated consumption data can be provided in chart form to a utility company, consumer, user, or the like. As an example, data logging module 224 formats the consumption data to facilitate generating a chart showing a total consumption over a measurement period associated with individual utility consuming appliances. Therefore, a utility company, consumer, user, or the like may access information from consumption log 228 to determine total consumption associated with individual utility appliances.

Restriction schedule module 226 may be configured to generate, receive, and/or store a restriction schedule that indicates, for example, a type of restricted activity and/or event (e.g., irrigation), seasons and/or which days or times activity is allowed or not allowed, duration activity is allowed, and/or mitigation to take place if a violation is detected. The utility restriction schedule may indicate that particular activities (e.g., irrigation, air-conditioning, operating a dishwasher, etc.) are not permitted at the service site during particular time periods (e.g., every Monday during the Winter, every Monday/Wednesday/Friday during the Spring, any day during the Summer, etc.). The ET module 206 may determine, based on the restriction schedule module 226, that one of these restricted activities occurred and/or is in occurrence at the service site during the restricted time (e.g., via data disaggregation) based on the obtained utility consumption data. In some cases, the restriction schedule module 226 may store restriction schedules associated with other devices, such as the nodes 110-122, such that the UDCD 202 is aware of multiple restriction schedules within a given utility network. In some examples, a node, such as the nodes 110-122, may provide a restriction schedule to another node based on the location of the service site in which the node is servicing. For example, the restriction schedule may be determined based on an address of the service site, and the node at that service site may receive the restriction schedule corresponding to that particular address.

In some cases, the restriction schedule module 226 may determine a mitigation action to execute in response to detecting a violation of the restriction schedule. For example, the restriction schedule module 226 may determine a number of previous violations associated with the service site and determine, based at least in part on the number of previous violations exceeding a threshold value, to restrict access to the utility at the service site. For example, the ET module 206 may store and/or otherwise have access to historical data associated with the service site (e.g., via the data logging module 224 and/or the consumption log 228) that includes an indication of how many previous violations have occurred at the service site. In some cases, the historical data may be associated with a user account (e.g., as opposed to a service site) such that the previous violations are associated with a user associated with the user account to prevent repeat violator mitigation actions in cases where the service site has changed owners.

The mitigation actions may change based on a number of previous violations associated with the service site and/or the user account. For example, a first violation in a given month may result in a warning, a second violation in the given month may result in a citation, and a third violation in the given month may result in a restriction to access to the utility. In one example, where the utility includes water and the restricted activity includes an irrigation activity, the restriction schedule module 226 may cause the UDCD 202 to restrict access to the water at the service site by reducing a flow rate of the water such that the water is unable to be utilized in outdoor irrigation, but still have enough flow rate for the service site to use other appliances, such as a sink and/or a shower.

In some cases, the restriction schedule module 226 may change a sampling rate associated with detecting utility flow rate at a service site. For example, the consumption meter 204 and/or the rate measurement module 220 may monitor utility flow and/or consumption at a first sampling rate prior to detecting any restriction violations and/or prior to a number of restriction violations exceeding a threshold value (e.g., three violations). The first sampling rate may include a standard sampling rate that the nodes (e.g., smart utility meters) are initially set at based on industry standards determined by the utility provider. After the restriction schedule module 226 has determined that a violation has occurred and/or or that a threshold number of violations has been met, the sampling rate may be set to a second sampling rate that is greater than the first sampling rate. Increasing the sampling rate of the consumption meter 204 and/or the rate measurement module 220 enables the UDCD 202 to more quickly detect, and thereby prevent, an attempt to continuously violate the restriction schedule. For example, at the first sampling rate, the UDCD 202 may require 5 minutes to determine that a particular activity constitutes a violation within a certain degree of confidence (e.g., 95% confidence), whereas at the second sampling rate, the UDCD 202 may only take 1 minute to determine that the activity constitutes a violation because the additional samples from the increased sampling rate may provide a result within the same degree of confidence over the shortened period of time.

ET module 206 may include computer-readable media. Computer-readable media may include two types of computer-readable media, namely computer-readable storage media and communications media.

Computer-readable storage media (e.g., memory 216, consumption log 228) includes volatile and non-volatile, removable and non-removable media implemented in any method or technology for storage of information such as computer readable instructions, data structures, program modules, or other data. Computer-readable storage media, such as consumption log 228, includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer-readable storage media does not include communication media.

Figure 3:
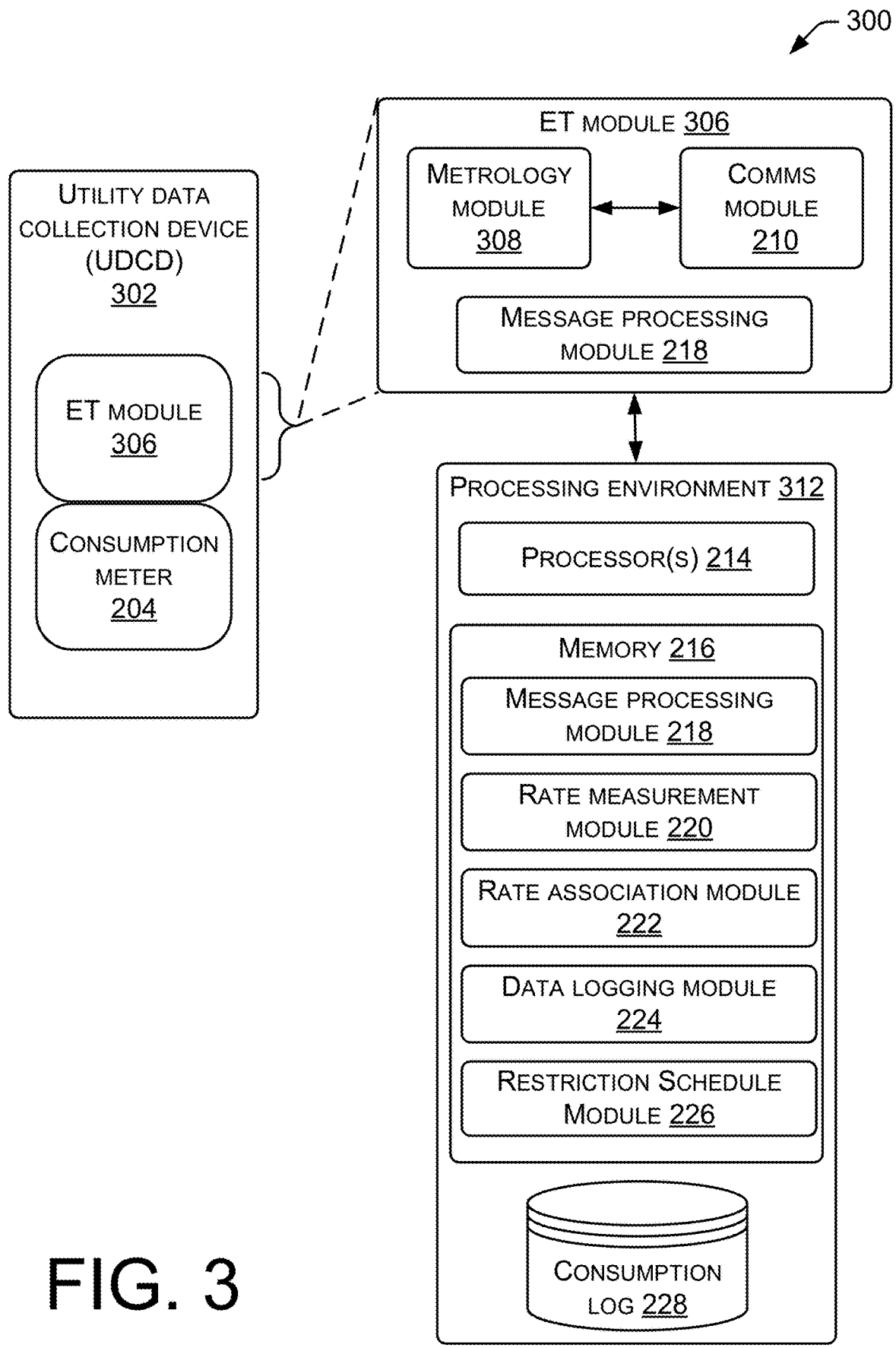
FIG. 3 is a schematic diagram of an example distributed processing environment and a utility data collection device for associating utility flowrates with utility consuming loads to identify violations.

FIG. 3 is a schematic diagram of example architecture 300 of using a utility data collection device (e.g., smart utility meter) to associate utility flowrates with utility consuming loads in a distributed processing environment. As shown in example architecture 300, utility data collection device (UDCD) 302 (e.g., a smart utility meter) includes consumption meter 204, as described with respect to FIG. 2 and ET module 306.

ET module 306 includes metrology module 308, comms module 210 and message processing module 218, as described with respect to FIG. 2. Using message processing module 218, ET module 306 may respond to commands to provide consumption data obtained, for example, from consumption meter 204. Metrology module 308 may be configured to convert the consumption data provided by consumption meter 204 to specific units (e.g., cubic feet) and format the consumption data for processing, transmission and/or storage. Metrology module 308 may include memory, one or more processors and one or more modules (not shown) for formatting the consumption data from consumption meter 204. Metrology module 308 may be configured to provide consumption data to processing environment 312. As an example, metrology module 308 may provide consumption data to processing environment 312 using comms module 210 in response to a message request, or at various time durations.

In example architecture 300, processing environment 312 is shown as separate from ET module 306. Processing environment 312 may include a distributed processing environment in direct or indirect communication with UDCD 302, such as via comms module 210. As an example, processing environment 312 may be located at a utility company central office, or distributed among multiple offices or other locations. Processing environment 312 is shown in FIG. 3 to have components including processor(s) 214, memory 216, message processing module 218, rate measurement module 220, rate association module 222, data logging module 224, restriction schedule module 226, and consumption log 228, as described with respect to FIG. 2. Various components of processing environment 312 may be located in ET module 306. As an example, metrology module 308 and/or ET module 306 may contain some or all of the functionality associated with rate measurement module 220, as well as data logging module 224 and consumption log 228.

Thus, processing environment 312 may be configured to provide functionality comparable to the functionality provided by processing environment 212, described herein with regard to FIG. 2.

Example Monitoring of Consumption Rates

Figure 4:
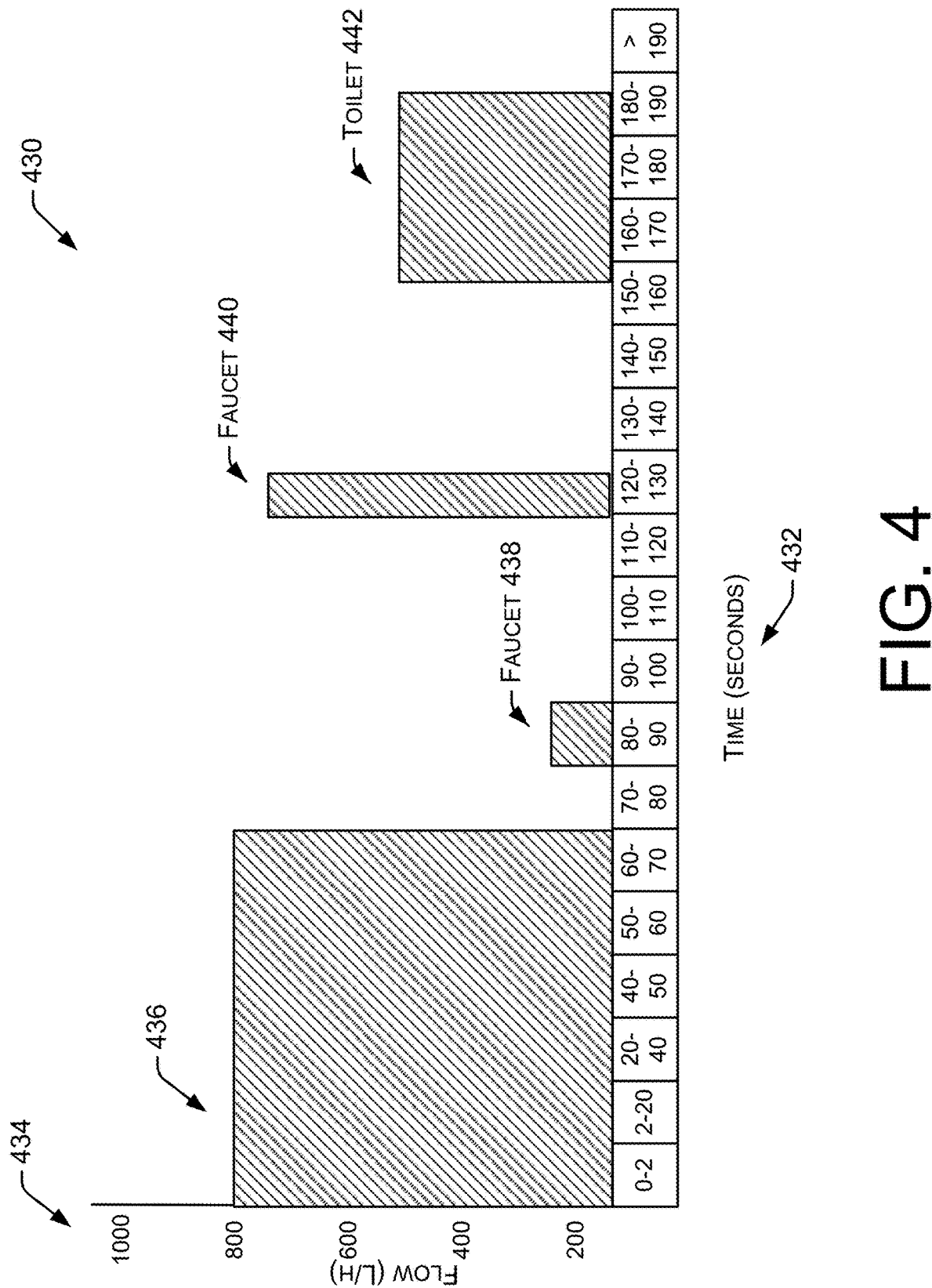
FIG. 4 is an example chart showing various consumption rates associated with various water consuming loads and/or activities.

FIG. 4 is a diagram showing an example chart 430 of a distribution of utility consumption activities at various consumption rate ranges. The horizontal x-axis 432 illustrates example time periods by seconds and the vertical y-axis 434 illustrates example flow rate measured by liters per hour (L/h). In the context of the example of FIG. 2, rate measurement module 220 detects a consumption rate of water in the range of approximately 800 L/h, for approximately 70 seconds. The rate association module 222 may be configured to categorize measured consumption rates (e.g., utility flowrates) determined or measured by rate measurement module 220. As an example, rate association module 222 may categorize measured flowrates into known activities and/or usage loads. For instance, the rate association module 222 may be provided (e.g., via a utility supplier) or may determine (e.g., based on historical flowrates) average flowrates for water for individual utility loads at a given service site. By way of example, average rates for some loads may include a toilet flush may correlate to an average flow rate of 1-10 liters per minute (L/min) and an average volume of 9-16 L. A shower usage may correlate to an average flow rate of 6-19 L/min. A dishwasher usage may correlate to an average flow rate of 5-7 L/min and an average volume of 15-40 L. A washing machine usage may correlate to an average volume of 45-170 L. A faucet usage may correlate to an average flow rate of 7 L/min. An irrigation usage may correlate to an average flow rate of 30-70 L/min. A bath usage may correlate to an average flow rate of 19-20 L/min and an average volume of 70-170 L. As the utility consumption data is obtained in real-time via the rate measurement module 220, the rate association module 222 may compare the flowrate of the received utility consumption data to flowrates of known utility loads to identify the activity being performed and/or the utility load being used. As illustrated in the example chart 430, the rate association module 222 may determine that an irrigation event 436 is occurring at the service site.

As illustrated in example chart 430, the rate association module 222 may further identify a faucet event 438, a faucet event 440, and a toilet flushing event 442, based on comparing the flowrate of the received utility consumption data to flowrates of known utility loads to identify the activity being performed and/or the utility load being used.

Example User Interface for Violation Notification

Figure 5:
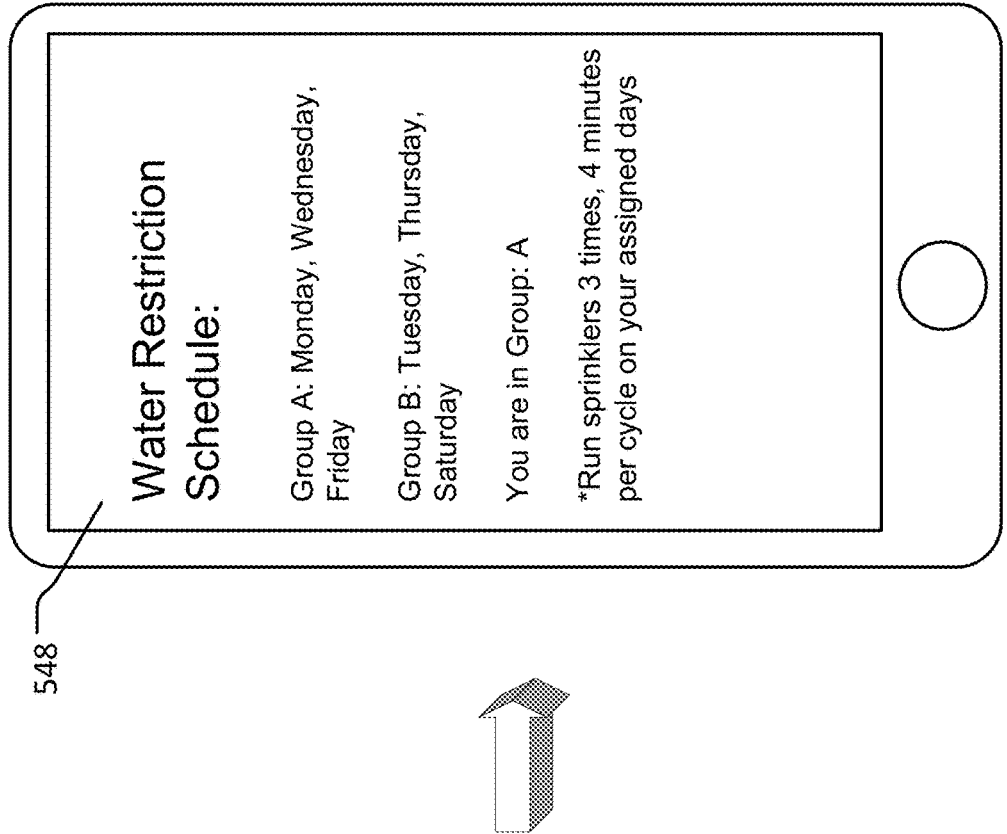
FIG. 5 is an example user interface illustrating an example notification sent to a user device regarding a violation of a restriction schedule.
Figure 5:
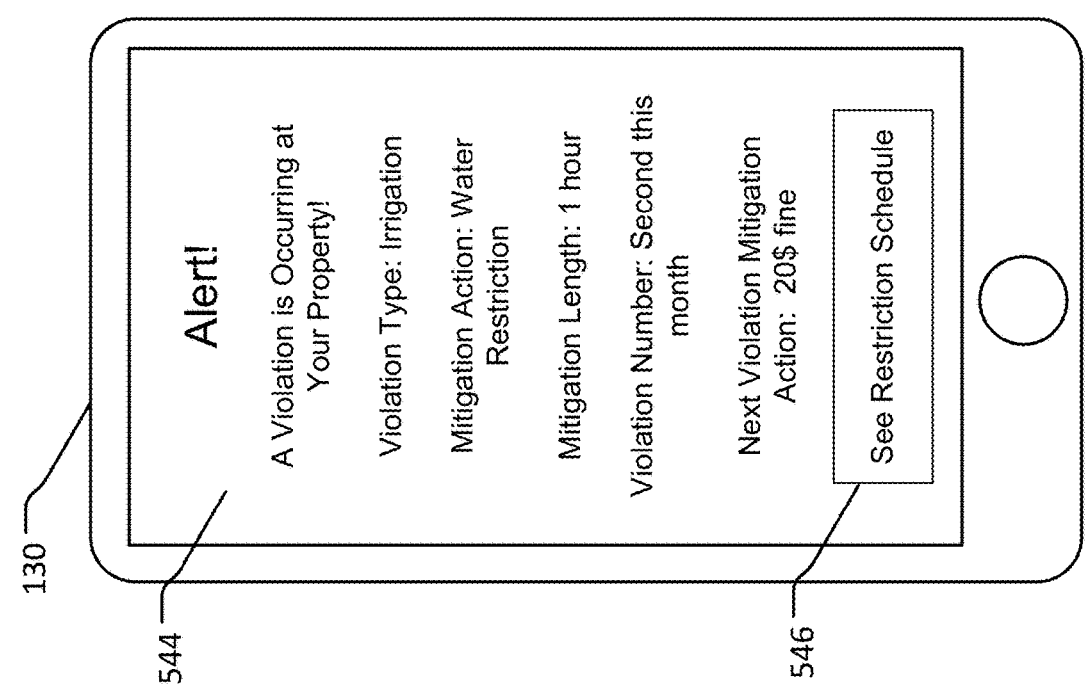

FIG. 5 illustrates an example interface that may be presented to a user via the user device 130 to inform the user of a violation event occurring at a service site associated with the user and/or a user account associated with the user. As shown, a notification 544 may be sent to the user device 130 via the node located at the service site (e.g., node 120), the central office 106, and/or the router device 102. The notification 544 may include an alert containing information detailing the violation, such as, but not limited to, a violation type (e.g., irrigation), a mitigation action (e.g., water restriction), a mitigation action length of time (1 hour), a number of violations associated with the user, the user account, and/or the service site (e.g., second violation this month), an indication of the next mitigation action if a subsequent violation is to occur (e.g., a 20$ fine). The notification 544 may also include a selectable option 546 to view the restriction schedule that the user is violating. For example, selecting the option 546 may cause the user device 130 to present a restriction schedule 548, which may illustrate a number of groups and their respective restriction schedules.

Example Processes for Monitoring Utility Consumption

Figure 6:
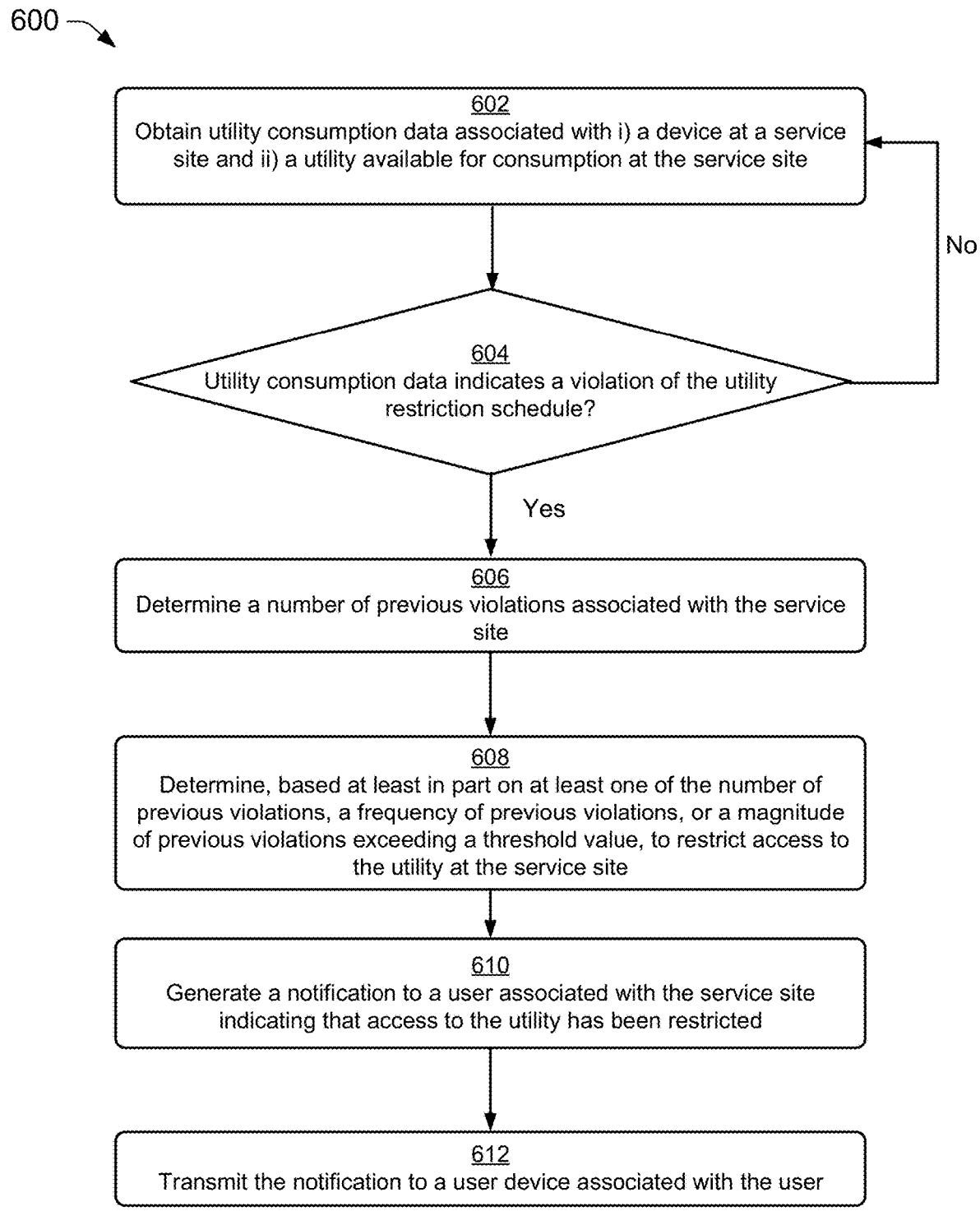
FIG. 6 is a flow diagram showing an example process of monitoring utility consumption and determining that a restriction schedule violation has occurred.
Figure 7:
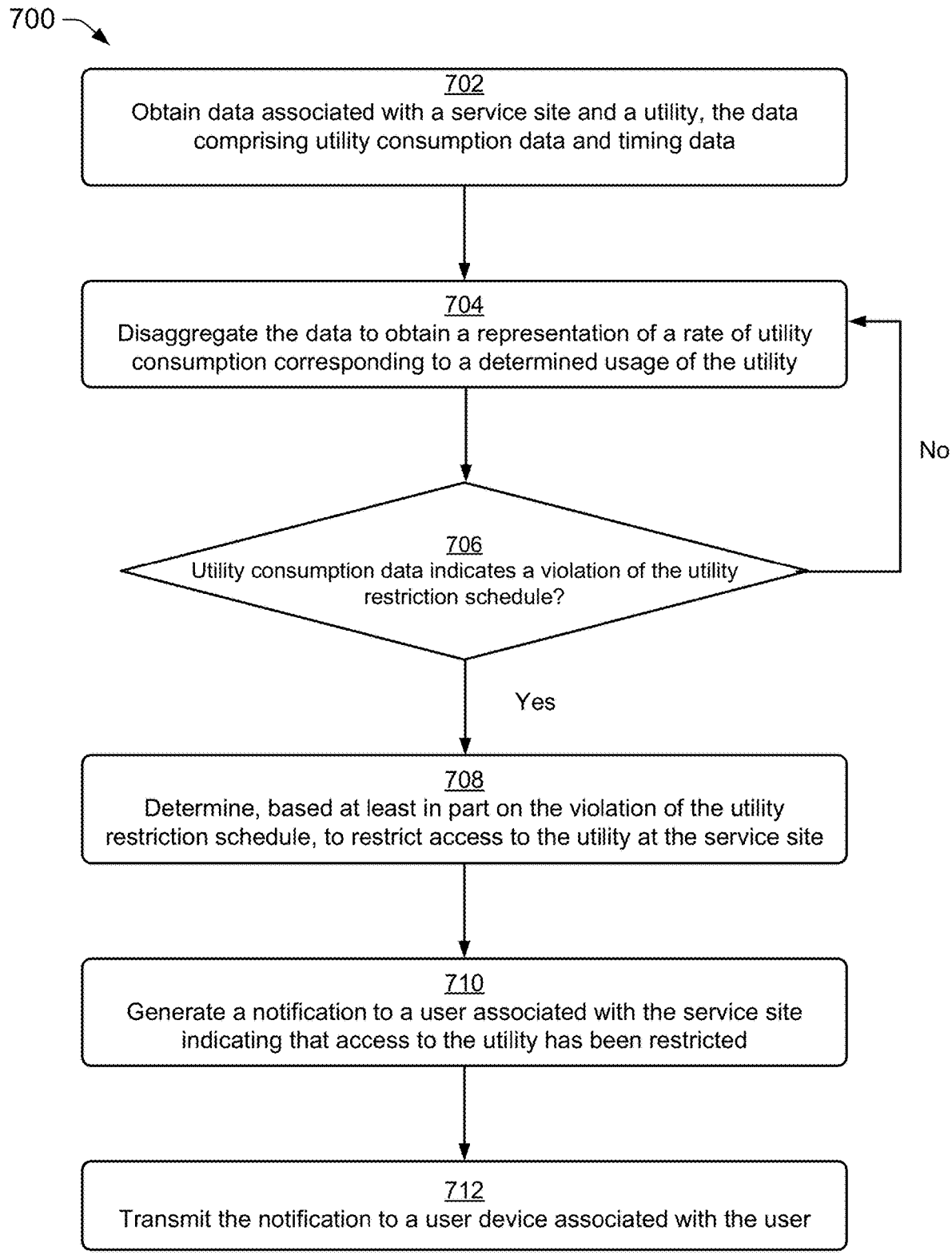
FIG. 7 is a flow diagram showing another example process of monitoring utility consumption and determining that a restriction schedule violation has occurred.

FIG. 6 illustrates an example process 600 of monitoring utility consumption and determining that a restriction schedule violation has occurred. Process 600 is described with reference to the example architecture 200 of FIG. 2 for convenience. However, process 600 is not limited to use with the example architecture 200 of FIG. 2 and may be implemented using other architectures and devices, such as example architecture 300 shown in FIG. 3. While an order of the blocks illustrated in FIGS. 6 and 7 are shown, the order of execution may be changed, and blocks may be omitted, without departing from the method as disclosed or claimed. The process may be performed by any device, such as those having a processor and memory. In several examples, the process may be performed by a smart utility metering device. The processes may be performed by one or more computer devices such as a server within the central office 106, a cloud-based computing service, or other computing device, etc. Portions of the processes may be performed by a headend device (e.g., the server at the central office 106), a service point (e.g., node 108) or performed by a combination of these or other devices. In an example, the processes may be performed by execution of software and/or stand-alone or cooperating application(s) running on a smart meter, central office server, and/or other device. In the examples of FIG. 1, the techniques may include and/or be configured as an application able to execute the methods. In the examples of FIGS. 2 and 3, the processes may be performed by software stored in memory 216 and executed by a processing device and/or processor 214.

The process 600 may begin at block 602, and include obtaining utility consumption data associated with i) a device at a service site and ii) a utility available for consumption at the service site. For example, ET module 206 contains metrology module 208 for receiving and processing consumption data from consumption meter 204. Metrology module 208 may be configured to convert the consumption data provided by consumption meter 204 to specific units (e.g., liters, cubic feet, wattage, etc.) and format the consumption data for processing, transmission and/or storage. Metrology module 208 may include memory, one or more processors and one or more modules for processing the consumption data from consumption meter 204.

The rate measurement module 220 may be configured to process consumption information, such as data received from metrology module 208, to determine various consumption rates (e.g., instantaneous utility flowrates). As an example, rate measurement module 220 is configured to associate a time interval between known amounts of consumption at consumption meter 204, such that consumption rates may be measured over time intervals. Rate measurement module 220 may be configured to process consumption amounts provided by consumption meter 204 via metrology module 208 to determine utility flowrates at consumption meter 204. Rate measurement module 220 may be configured to pass measured consumption rates to rate association module 222.

At block 604, the process 600 may include determining, if the utility consumption data indicates a violation of the utility restriction schedule. For example, restriction schedule module 226 may be configured to generate, receive, and/or store a restriction schedule that indicates, for example, a type of restricted activity and/or event (e.g., irrigation), seasons and/or which days and times activity is allowed or not allowed, duration activity is allowed, and/or mitigation to take place if a violation is detected. The utility restriction schedule may indicate that particular activities (e.g., irrigation, air-conditioning, operating a dishwasher, etc.) are not permitted at the service site during particular time periods (e.g., every Monday during the Winter, every Monday/Wednesday/Friday during the Spring, any day during the Summer, etc.). The ET module 206 may determine, based on the restriction schedule module 226, that one of these restricted activities occurred and/or is in occurrence at the service site during the restricted time (e.g., via data disaggregation) based on the obtained utility consumption data. In some cases, the restriction schedule module 226 may store restriction schedules associated with other devices, such as the nodes 110-122, such that the UDCD 202 is aware of multiple restriction schedules within a given utility network. In some examples, a node, such as the nodes 110-122, may provide a restriction schedule to another node based on the location of the service site in which the node is servicing. For example, the restriction schedule may be determined based on an address of the service site, and the node at that service site may receive the restriction schedule corresponding to that particular address.

If, at block 604, it is determined that the utility consumption data does not indicate a violation of the utility restriction schedule, then the process 600 returns to block 602.

If, at block 604, it is determined that the utility consumption data does indicate a violation of the utility restriction schedule, then the process 600 moves on to block 606.

At block 606, the process 600 may include determining a number of previous violations associated with the service site. For example, the UDCD 202 may store and/or otherwise have access to historical data associated with the service site that includes an indication of how many previous violations have occurred at the service site. In some cases, the historical data may be associated with a user account (e.g., as opposed to a service site) such that the previous violations are associated with a user associated with the user account to prevent repeat violator mitigation actions in cases where the service site has changed owners.

At block 608, the process 600 may include determining, based at least in part on at least one of the number of previous violations, a frequency of previous violations, or a magnitude of previous violations exceeding a threshold value, to restrict access to the utility at the service site. For example, the node 120 may determine a number of previous violations associated with the service site and determine, based at least in part on the number of previous violations exceeding a threshold value, to restrict access to the utility at the service site. For example, the node 120 may store and/or otherwise have access to historical data associated with the service site that includes an indication of how many previous violations have occurred at the service site. In some cases, the historical data may be associated with a user account (e.g., as opposed to a service site) such that the previous violations are associated with a user associated with the user account to prevent repeat violator mitigation actions in cases where the service site has changed owners. The mitigation actions may change based on a number of previous violations associated with the service site and/or the user account. For example, a first violation in a given month may result in a warning, a second violation in the given month may result in a citation, and a third violation in the given month may result in a restriction to access to the utility.

At block 610, the process 600 may include generating a notification to a user associated with the service site indicating that access to the utility has been restricted. For example, the node 120 may generate a notification to a user associated with the service site indicating that access to the utility has been restricted and transmit the notification to a user device 130 associated with the user. For example, the node 120 may access an application programming interface (API) accessible via the user device 130 and send messages to the user device 130 via the API.

At block 612, the process 600 may include transmitting the notification to a user device associated with the user. For example, the node 120 may cause a text-message, voicemail, email, or any other kind of communication to be sent to the user device 130 indicating that the utility has been restricted due to a restriction violation. In some examples, the user device 130 may include an in-home device, such as a thermostat, a voice-controlled device, a television, etc.

FIG. 7 illustrates an example process 700 of monitoring utility consumption and determining that a restriction schedule violation has occurred. Process 700 is described with reference to the example architecture 200 of FIG. 2 for convenience. However, process 700 is not limited to use with the example architecture 200 of FIG. 2 and may be implemented using other architectures and devices, such as example architecture 300 shown in FIG. 3.

The process 700 may begin at block 702, and include obtaining data associated with a service site and a utility, the data comprising utility consumption data; and timing data indicating duration of a plurality of time intervals between switch closures of the smart utility meter, wherein each switch closure indicates measurement of a unit of the utility. For example, ET module 206 contains metrology module 208 for receiving and processing consumption data from consumption meter 204. Metrology module 208 may be configured to convert the consumption data provided by consumption meter 204 to specific units (e.g., liters, cubic feet, wattage, etc.) and format the consumption data for processing, transmission and/or storage. Metrology module 208 may include memory, one or more processors and one or more modules for processing the consumption data from consumption meter 204. In an example, data acquisition steps are performed by device(s) that are specialized to measure fluid flowrates. In particular examples, the time between reed switch closures and/or the generation and/or timing of an ultrasonic pulse transit are performed by specialized devices (e.g., timers, processors, etc.). Accordingly, these functions are "concrete" actions, involving mechanical actions (e.g., switch closures and pulses), and not abstract concepts. Similarly, disaggregation and historic comparisons are too complex to be performed by a human in a timely manner.

The rate measurement module 220 may be configured to process consumption information, such as data received from metrology module 208, to determine various consumption rates (e.g., instantaneous utility flowrates). As an example, rate measurement module 220 is configured to associate a time interval between known amounts of consumption at consumption meter 204, such that consumption rates may be measured over time intervals. Rate measurement module 220 may be configured to process consumption amounts provided by consumption meter 204 via metrology module 208 to determine utility flowrates at consumption meter 204. Rate measurement module 220 may be configured to pass measured consumption rates to rate association module 222.

At block 704, the process 700 may include disaggregating the data to obtain a representation of a rate of utility consumption corresponding to a determined usage of the utility. For example, the techniques may accumulate utility usage information and determine various consumption rates associated with utility consuming loads and/or utility consuming activities (e.g., fixed-rate consumption utility appliances). As an example, an enhanced utility meter measures utility flowrates, categorizes the measured utility flowrates, associates the categorized utility flowrates with utility consuming loads and/or appliances and outputs a result to include utility consumption data with the utility consuming loads. In this example, utility flowrates of individual utility consuming loads and utility flowrates indicating simultaneous operation of multiple individual utility consuming loads may be recognized. Utility consuming loads and/or appliances (e.g., sprinkler system, shower, dishwasher, washing machine, etc.) may be associated with utility consumption so that a consumer may track a total consumption or a total cost of operating individual appliances over a measurement period.

Various utility consuming loads, such as a sprinkler system, shower, dishwasher, washing machine, may use a variable rate of utility (e.g., water) depending on a number of sprinklers in operation and/or a flowrate to the respective faucet (in the case of a sink). By recording an amount of utility used at various consumption rates, information may be extracted that indicates how much utility is used by individual utility consumption loads.

A usage profile may be collected, such as by a utility company, and used to determine a specific activity being performed at the service site and/or which load is being used at the service site based on comparing the measured utility consumption data to the usage profile. By way of example, a usage profile for a particular service site may indicate a number of usage events and their associated average flowrates and/or average volumes. For example, a toilet flush may correlate to an average flow rate of 1-10 liters per minute (L/min) and an average volume of 9-16 L. A shower usage may correlate to an average flow rate of 6-19 L/min. A dishwasher usage may correlate to an average flow rate of 5-7 L/min and an average volume of 15-40 L. A washing machine usage may correlate to an average volume of 45-170 L. A faucet usage may correlate to an average flow rate of 7 L/min. An irrigation usage may correlate to an average flow rate of 30-70 L/min. A bath usage may correlate to an average flow rate of 19-20 L/min and an average volume of 70-170 L. As the utility consumption data is obtained in real-time, the flowrate identified in the utility consumption data may be determined and compared to flowrates of known utility loads to identify the activity being performed and/or the utility load being used.

At block 706, the process 700 may include determining, if the determined usage indicates a violation of the utility restriction schedule. For example, restriction schedule module 226 may be configured to generate, receive, and/or store a restriction schedule that indicates, for example, a type of restricted activity and/or event (e.g., irrigation), seasons and/or which days or times activity is allowed or not allowed, duration activity is allowed, and/or mitigation to take place if a violation is detected. The utility restriction schedule may indicate that particular activities (e.g., irrigation, air-conditioning, operating a dishwasher, etc.) are not permitted at the service site during particular time periods (e.g., every Monday during the Winter, every Monday/Wednesday/Friday during the Spring, any day during the Summer, etc.). The ET module 206 may determine, based on the restriction schedule module 226, that one of these restricted activities occurred and/or is in occurrence at the service site during the restricted time (e.g., via data disaggregation) based on the obtained utility consumption data. In some cases, the restriction schedule module 226 may store restriction schedules associated with other devices, such as the nodes 110-122, such that the UDCD 202 is aware of multiple restriction schedules within a given utility network. In some examples, a node, such as the nodes 110-122, may provide a restriction schedule to another node based on the location of the service site in which the node is servicing. For example, the restriction schedule may be determined based on an address of the service site, and the node at that service site may receive the restriction schedule corresponding to that particular address.

If, at block 706, it is determined that the utility consumption data does not indicate a violation of the utility restriction schedule, then the process 700 returns to block 704.

If, at block 706, it is determined that the utility consumption data does indicate a violation of the utility restriction schedule, then the process 700 moves on to block 708.

At block 708, the process 700 may include determining, based at least in part on the violation of the utility restriction schedule, to restrict access to the utility at the service site. For example, the node 120 may determine a number of previous violations associated with the service site and determine, based at least in part on the number of previous violations exceeding a threshold value, to restrict access to the utility at the service site. For example, the node 120 may store and/or otherwise have access to historical data associated with the service site that includes an indication of how many previous violations have occurred at the service site. In some cases, the historical data may be associated with a user account (e.g., as opposed to a service site) such that the previous violations are associated with a user associated with the user account to prevent repeat violator mitigation actions in cases where the service site has changed owners. The mitigation actions may change based on a number of previous violations associated with the service site and/or the user account. For example, a first violation in a given month may result in a warning, a second violation in the given month may result in a citation, and a third violation in the given month may result in a restriction to access to the utility.

At block 710, the process 700 may include generating a notification to a user associated with the service site indicating that access to the utility has been restricted. For example, the node 120 may generate a notification to a user associated with the service site indicating that access to the utility has been restricted and transmit the notification to a user device 130 associated with the user. For example, the node 120 may access an application programming interface (API) accessible via the user device 130 and send messages to the user device 130 via the API.

At block 712, the process 700 may include transmitting the notification to a user device associated with the user. For example, the node 120 may cause a text-message, voicemail, email, or any other kind of communication to be sent to the user device 130 indicating that the utility has been restricted due to a restriction violation. In some examples, the user device 130 may include an in-home device, such as a thermostat, a voice-controlled device, a television, etc.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method, comprising:
   obtaining utility consumption data associated with i) a device at a service site and ii) a utility available for consumption at the service site;
   determining, based at least in part on a utility restriction schedule associated with the service site, that the utility consumption data indicates a violation of the utility restriction schedule;
   determining a number of previous violations associated with the service site;
   determining, based at least in part on at least one of the number of previous violations, a frequency of previous violations, or a magnitude of previous violations exceeding a threshold value, to restrict access to the utility at the service site;
   generating a notification to a user associated with the service site indicating that access to the utility has been restricted; and
   transmitting the notification to a user device associated with the user.

2. The method of claim 1, further comprising generating a plurality of utility restriction schedules associated with a plurality of service sites, wherein each utility restriction schedule of the plurality of utility restriction schedules is associated with a different period of time.

3. The method of claim 1, further comprising disaggregating the utility consumption data to obtain a representation of a rate of utility consumption corresponding to a determined usage of the utility.

4. The method of claim 3, wherein the determined usage includes outdoor irrigation, and the violation of the utility restriction schedule is determined in response to the determined usage including outdoor irrigation.

5. The method of claim 3, wherein the determined usage includes operation of an electrical appliance, and the violation of the utility restriction schedule is determined in response to the determined usage including usage of the electrical appliance.

6. The method of claim 3, wherein restricting access to the utility at the service site comprises reducing a flow rate of the utility at the service site such that the utility is unable to be utilized for outdoor irrigation.

7. The method of claim 1, wherein the notification comprises a first notification, the method further comprising:
generating a second notification indicating the violation of the utility restriction schedule and indicating that access to the utility has been restricted; and
transmitting the second notification to a utility provider.

8. The method of claim 1, further comprising:
monitoring consumption of the utility at a first sampling rate prior to determining violation of the utility restriction schedule; and
monitoring consumption of the utility at a second sampling rate in response to determining violation of the utility restriction schedule, the second sampling rate being greater than the first sampling rate.

9. The method of claim 1, wherein the obtaining, generating, and transmitting are performed at:
a server at a central office;
a data processing component of the device at the service site; or
a node within a mesh network of smart utility meters.

10. The method of claim 1, wherein the obtaining, generating, and transmitting are performed at a data processing component of the device at the service site, the device comprising a smart utility meter.

11. A system, comprising:
a smart utility meter including:
a processor and memory configured with instructions, which when executed perform acts comprising:
obtaining data associated with a service site and a utility, the data associated with the service site and the utility comprising:
utility consumption data; and
timing data indicating duration of a plurality of time intervals between switch closures of the smart utility meter, wherein each switch closure indicates measurement of a unit of the utility;
disaggregating the data associated with the service site and the utility to obtain a representation of a rate of utility consumption corresponding to a determined usage of the utility;
determining, based at least in part on a utility restriction schedule associated with the service site, that the determined usage indicates a violation of the utility restriction schedule;
determining, based at least in part on the violation of the utility restriction schedule, to restrict access to the utility at the service site;
generating a notification to a user associated with the service site indicating that access to the utility has been restricted; and
transmitting the notification to a user device associated with the user.

12. The system of claim 11, wherein the transmitting the notification to the user device comprises transmitting the notification to an in-home device.

13. The system of claim 11, wherein the acts further comprise receiving the utility restriction schedule from a utility provider, wherein the utility restriction schedule is associated with a geographical area in which the smart utility meter is located.

14. The system of claim 11, wherein the determined usage includes outdoor irrigation, and the violation of the utility restriction schedule is determined in response to the determined usage including outdoor irrigation.

15. The system of claim 11, wherein the determined usage includes operation of an electrical appliance, and the violation of the utility restriction schedule is determined in response to the determined usage including usage of the electrical appliance.

16. The system of claim 11, wherein the acts further comprise:
monitoring consumption of the utility at a first sampling rate prior to determining violation of the utility restriction schedule; and
monitoring consumption of the utility at a second sampling rate in response to determining violation of the utility restriction schedule, the second sampling rate being greater than the first sampling rate.

17. One or more non-transitory computer-readable media storing computer-executable instructions that, when executed by one or more processors, configure a computing device to perform acts comprising:
obtaining utility consumption data associated with i) a device at a service site and ii) a utility available for consumption at the service site;
determining, based at least in part on a utility restriction schedule associated with the service site, that the utility consumption data indicates a violation of the utility restriction schedule;
determining a number of previous violations associated with the service site;
determining, based at least in part on at least one of the number of previous violations, a frequency of previous violations, or a magnitude of previous violations exceeding a threshold value, to restrict access to the utility at the service site;
generating a notification to a user associated with the service site indicating that access to the utility has been restricted; and
transmitting the notification to a user device associated with the user.

18. One or more non-transitory computer-readable media as recited in claim 17, wherein the acts further comprise generating a plurality of utility restriction schedules associated with a plurality of service sites, wherein each utility restriction schedule of the plurality of utility restriction schedules is associated with a different period of time.

19. One or more non-transitory computer-readable media as recited in claim 17, wherein the acts further comprise disaggregating the utility consumption data to obtain a representation of a rate of utility consumption corresponding to a determined usage of the utility.

20. One or more non-transitory computer-readable media as recited in claim 19, wherein the determined usage includes outdoor irrigation, and the violation of the utility restriction schedule is determined in response to the determined usage including outdoor irrigation.

* * * * *